United States Patent [19]

Ueda et al.

[11] Patent Number: 5,697,243
[45] Date of Patent: Dec. 16, 1997

[54] SHAPE SCRAP PROCESSING APPARATUS

[75] Inventors: Toshinobu Ueda; Takashi Otsuka; Tamotsu Ohashi, all of Toyama-ken, Japan

[73] Assignee: YKK Corporation, Tokyo, Japan

[21] Appl. No.: 670,938

[22] Filed: Jun. 27, 1996

[30] Foreign Application Priority Data

Jun. 29, 1995 [JP] Japan .................................. 7-163467

[51] Int. Cl.$^6$ ........................... B30B 9/32; B21D 28/00
[52] U.S. Cl. ........................... 72/337; 72/256; 83/923; 100/95
[58] Field of Search ........................... 72/332, 337, 338, 72/254, 255, 256; 83/923; 100/95

[56] References Cited

U.S. PATENT DOCUMENTS

| | | | |
|---|---|---|---|
| 3,049,988 | 8/1962 | Lindemann | 100/95 |
| 3,367,019 | 2/1968 | Williamson | 100/95 |
| 3,945,315 | 3/1976 | Dahlem | 83/923 |
| 4,213,385 | 7/1980 | Dahlem | 100/95 |
| 4,230,037 | 10/1980 | Schmalz | 100/95 |
| 4,253,388 | 3/1981 | Vezzani | 83/923 |
| 4,552,062 | 11/1985 | Vezzani | 83/923 |
| 4,727,786 | 3/1988 | Quante | 83/923 |

*Primary Examiner*—Daniel C. Crane
*Attorney, Agent, or Firm*—Hill, Steadman & Simpson

[57] ABSTRACT

A shape scrap processing apparatus adapted to be situated next to a conveying table for conveying a continuous shape cut in a regular size. The apparatus comprises: conveying means for conveying shape scraps, which are discharged from the conveying table, intermittently by a regular length at a time in a longitudinal direction; pressing means disposed contiguously to the conveying means downstream thereof, and operable while the conveying of the shape scraps is stopped, for pressing the shape scraps into a regular size; cutting means disposed side by side to the pressing means for cutting the shape scraps into a regular size in response to the operation of the pressing means; and discharging means for discharging the cut scraps pressed by the pressing means and cut by the cutting means.

4 Claims, 4 Drawing Sheets

SHAPE SCRAP PROCESSING APPARATUS

BACKGROUND OF THE INVENTION

1. Field of the Invention

This invention relates to a shape scrap processing apparatus for efficiently processing scraps, such as ends of extruded shapes of aluminum alloy or other metal, which are produced during extrusion process.

2. Description of the Related Art

The above-mentioned extruded shape, e.g. a continuous shape such as an aluminum sash bar having a predetermined unique cross-sectional shape, is continuously molded by extrusion and is cut into a predetermined size, and ends of the shape necessarily produced during the extrusion process, or shape scraps, such as fault products unexpectedly produced, are necessarily removed as unmarketable products to be collected for recycling.

If the shape scraps are collected in the original form and are conveyed to a recycling apparatus, they are necessarily very small in specific gravity with respect to the entire volume and hence poor in handling efficiency, which would obstruct the reduction of labor. Attempts have been made to eliminate the conventional causes for such obstruction. These conventional measures are exemplified by the pressing method, the shearing method and the crashing method. According to, for example, Japanese Patent Laid-Open Publications Nos. Sho 52-133856 and 52-133869, after the shape scraps have been cut or crashed into a regular size, a desired quantity of the cut or crashed scraps is compressed into a form of extrusion material and is then heated at a hot extrusion temperature, whereupon the resulting extrusion material is continuously extruded as recycled material.

The above-mentioned pressing method is a method for pressing the cut shape scraps of a predetermined size to reduce the volume; but this method necessarily requires a large-sized pressing apparatus. Since the shearing method is a method for cutting a continuous shape scraps into a small size, it improves the handling efficiency but does not vary in specific gravity with respect to the entire volume. The crashing method improves the handling efficiency and increases the specific gravity with respect to the entire volume; but the crasher tool is not durable and hence makes management, such as maintenance, troublesome.

On the other hand, according to the shape-scrap recycling method disclosed in the above-mentioned publications, the shearing method or the crashing method is combined with the pressing method to realize continuous recycling in the same factory. However, since the shearing method or the crashing method is independent of the pressing method, the conventional recycling method is poor in processing efficiency, and requires a large-sized equipment with a very complicated structure, thus necessarily increasing the cost of equipment and causing an extensive space of equipment.

SUMMARY OF THE INVENTION

It is therefore an object of this invention to provide a shape scrap processing apparatus which is simple in construction and can realize effective reduction of volume of shape scraps.

According to this invention, the above object is accomplished by a shape scrap processing apparatus adapted to be situated next to a conveying table for conveying a continuous shape cut in a regular size, comprising: conveying means for conveying shape scraps, which are discharged from the conveying table, intermittently by a regular length at a time in a longitudinal direction; pressing means disposed contiguously to the conveying means downstream thereof, and operable while the conveying of the shape scraps is stopped, for pressing the shape scrap into a regular size; cutting means disposed side by side to the pressing means for cutting the shape scraps into a regular size in response to the operation of the pressing means; and discharging means for discharging the cut scraps pressed by the pressing means and cut by the cutting means.

In a preferable form, the shape scrap processing apparatus is disposed contiguously to the conveying table downstream thereof in a scrap conveying direction, or may be disposed beside the conveying table in parallel in the scrap conveying direction. In another preferable form, the shape scrap processing apparatus further includes detecting means disposed at an upstream end of the conveying means for detecting a trailing end of the shape scrap so as to stop actions of these means. In still another preferable form, the shape scrap processing apparatus further includes stopping means disposed in a confronting relationship to and spaced a predetermined distance downstreamwise from the conveying means for ensuring the regular-size cutting of the shape scraps. In a further preferable form, the shape scrap processing apparatus further includes receiving means disposed between the stopping means and pressing means for supporting and guiding the shape scraps from the lower side thereof and pivotally retractable downwardly in response to the operation of the cutting means for letting the cut shape scraps fall by gravity on the discharging means to discharge the scraps continuously outwardly.

In operation, shapes, which are obtained by extruding molten metal in a predetermined cross-sectional shape from an extruding apparatus, reforming the extruded shape into a straight form according to the usual method and then cutting the reformed shape into a predetermined size, are conveyed longitudinally by a roller conveyer. If ends of the shape produced during the extrusion process, or shape scraps, and fault products unexpectedly produced, are found while the shapes are conveyed to the next station via a product discharging conveyer, such ends and fault products are successively conveyed to the shape scrap processing apparatus of this invention directly or after stocked temporarily in a storage.

As a predetermined number of shape scraps are collected, the conveying table and the conveying means are driven to convey the shape scraps to the pressing means and cutting means by a predetermined length. Then the pressing means and cutting means are continuously operated, firstly to press a portion of the shape scraps to reduce its volume and then to cut the pressed portion of the shape scraps. At that time, the upstream unpressed portion of the shape scraps is pressed by the pressing means through a length substantially equal to the cut length to reduce the volume. The cut scraps are then dropped by gravity onto the discharging means for discharge to a predetermined outside position. As this procedure is repeated, the individual shape scraps are reduced in volume and cut into a smaller length.

With the stopping means disposed in a predetermined position downstream of the cutting means, cutting of the shape scraps exactly into a regular length can be ensured if the stoping means is set at a distance from the cutting means which is equal to the cut length. Alternatively, with the detecting means disposed at the upstream end of the conveying means, when the end of the shape scrap to be processed is automatically detected, the individual processing means are automatically stopped to assume their standby positions for the next cycle of operation.

DETAILED DESCRIPTION OF THE PREFERRED EMBODIMENT

Figure 1:
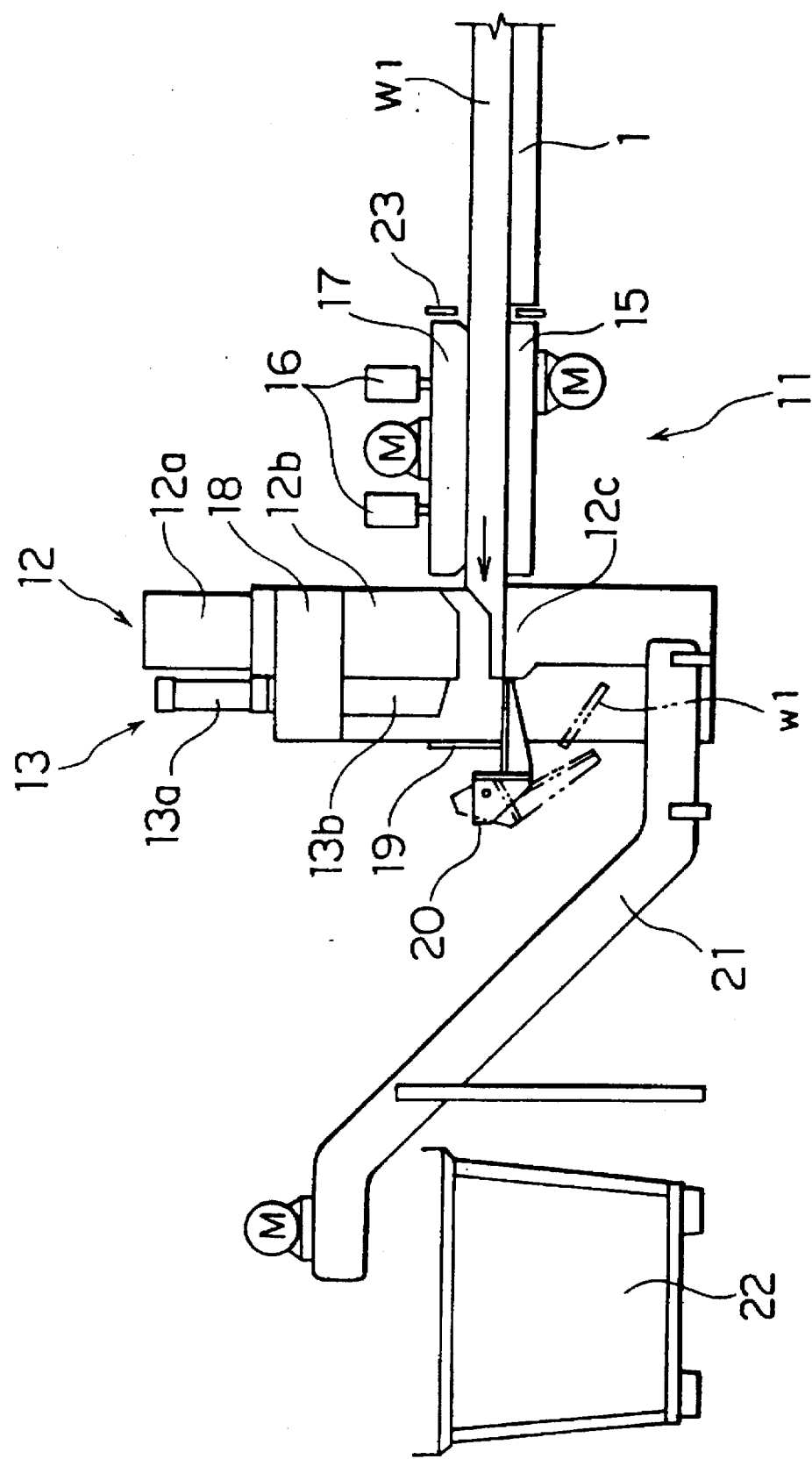
FIG. 1 is a side view showing a main part of a shape manufacturing machine equipped with a shape scrap processing apparatus according to this invention.
Figure 2:
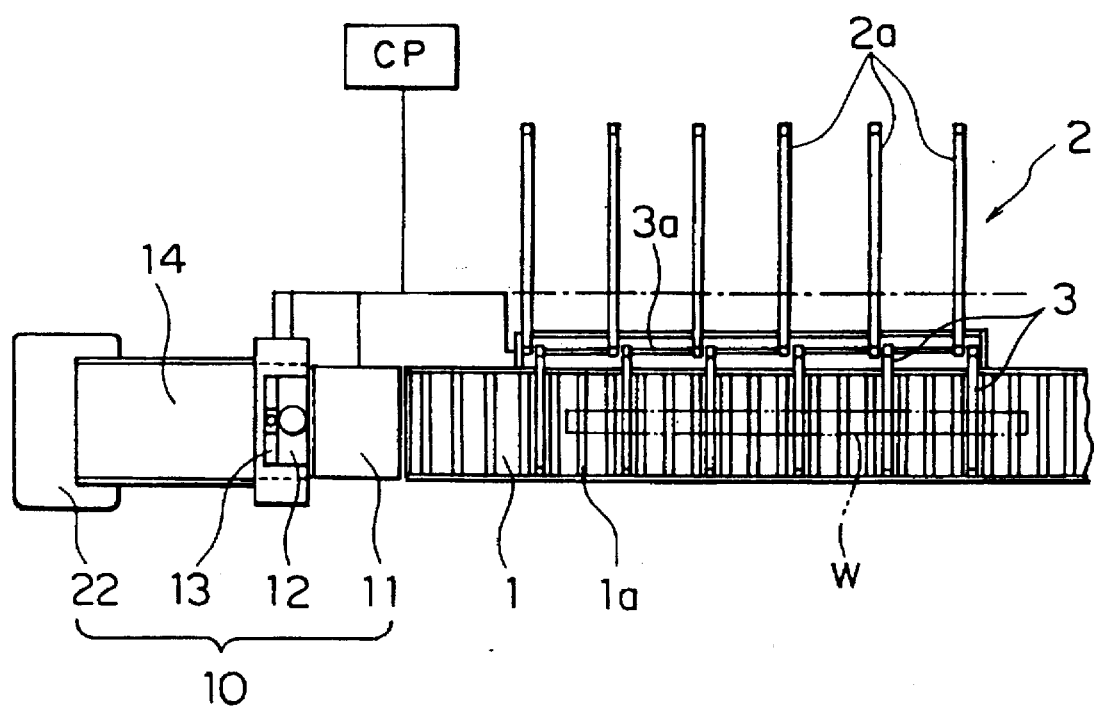
FIG. 2 is a plan view of FIG. 1.

A typical embodiment of this invention will now be described in detail with reference to the accompanying drawings. FIGS. 1 and 2 show a general structure of a shape scrap processing apparatus of this embodiment. In FIGS. 1 and 2, reference numeral 1 designates a continuous-shape conveying table which is equipped with a roller conveyer 1a for conveying shapes W, which are obtained by extruding molten metal in a predetermined cross-sectional shape from a non-illustrated extruder, then correcting the extruded shapes into a straight form according to the usual method and then cutting the corrected shapes into a regular length. On one side of the conveying table 1, a shape discharging unit 2 having a plurality of parallel shape discharge conveyers 2a is disposed perpendicularly to a shape traveling path.

Between rollers of the roller conveyer 1a located at a position corresponding to the position of the shape discharging unit 2, a plurality of pivotal arms 3 for transferring the shapes W, which are conveyed by the roller conveyer 1a to the shape discharging unit 2, are disposed below the conveying plane of the roller conveyer 1a and the discharge conveyer 2a. The roller-conveyer-side ends of the individual pivotal arm 3 are free ends, and their discharge-conveyer-side ends are connected by a common pivot shaft 3a pivotally supported on a part of a frame. As this pivot shaft 3a is controllably driven by a non-illustrated motor, the pivotal arms 3 are pivotally moved upwardly about the pivotal shaft 3a. Each pivotal arm 3 is equipped with a longitudinal conveyer belt, and each belt support wheel is disposed under the discharge conveyer 2a so that the shapes W are transferred onto the discharging unit 2 by a non-illustrated motor via a non-illustrated common driving shaft. This construction is similar to that of the conventional art, so its detailed description is omitted here.

The shape scrap processing apparatus 10 is disposed contiguously to the downstream end in the shape traveling direction of the conveying table 1. The shape scrap processing apparatus 10 comprises conveying means 11 for conveying continuous shape scraps W1, such as ends or fault shapes, which are discharged from the conveying table 1, intermittently by a regular length at a time longitudinally, pressing means 12 disposed contiguously downstream to the conveying means 11 in the shape-scrap traveling path and operable, while the conveying of the shape scraps W1 are stopped, to press the shape scraps W1 by a predetermined length, cutting means 13 connected to the pressing means 12 and operable substantially simultaneously with the operation of the pressing means 12, and discharging means 14 for discharging the final scraps w1, which are obtained by pressing the predetermined length of the shape scraps W1 by the pressing means 12 and then cutting the pressed portion of the shape scraps W1 into a length substantially equal to the predetermined length of the pressed shape scrap portion, to an external collecting basket or the like.

The conveying means 11 is composed of a stationary conveyer 15 having a common conveying plane with the conveying table 1 as shown in FIG. 1, and a vertically movable conveyer 17 disposed upwardly of the stationary conveyer 15 and movable upwardly and downwardly by a hydraulic cylinder 16. In operation, the vertical conveyer 17 is lowered to clamp the shape scraps W1 between the vertical conveyer 17 and the stationary conveyer 15, and the respective drives of the two conveyers 15, 17 are intermittently cooperative to convey the shape scraps to the next station, i.e. the pressing means 12 and the cutting means 13, by a predetermined length. In the illustrated example, the two conveyers 15, 17 are belt conveyers; alternatively, however, at least one of the two conveyers 15, 17 may be a roller conveyer.

The pressing means 12 and the cutting means 13 constitute the most important part of this invention. The pressing means 12 is composed of a hydraulic cylinder 12a, a punch 12b and a die 12c. The cutting means 13 is composed of a hydraulic cylinder 13a and a cutting blade 13b. As shown in FIG. 1, the hydraulic cylinders 12a, 13a are fixedly supported by a common bracket 18 mounted on a non-illustrated frame, and they are actuated at a predetermined timing by a command from a central controller CP.

Further, a stopper 19 as stopping means is disposed at the downstream end of the shape scrap traveling path for contacting with a leading end of the shape scraps W1 to prevent the shape scraps W1 from advancing further, and also to define a length of cut scraps w1. Between the stopper 19 and the die 12c, there is disposed a shape-scrap receiving member 20 pivotally supported at its downstream end and having a receiving surface at the same level as the shape scrap traveling plane. At the stage where the shape scraps W1 are conveyed on the conveying means 11, the shape scrap receiving member 20 is pivotally moved until its receiving surface reaches the same level as the shape scrap traveling plane, and is pivotally moved in the reverse direction to the phantom-line position in FIG. 1 during the actuation of the cutting means 13. The pivotal motion of the shape scrap receiving member 20 is performed by a non-illustrated hydraulic cylinder.

Figure 3A:
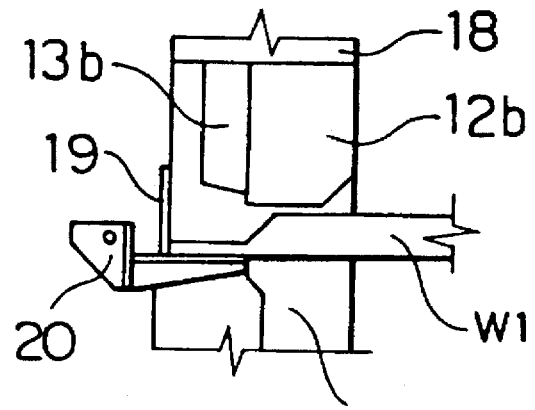
FIGS. 3(A), 3(B) and 3(C) show the procedure in which shape scraps are processed according to this invention.
Figure 3B:
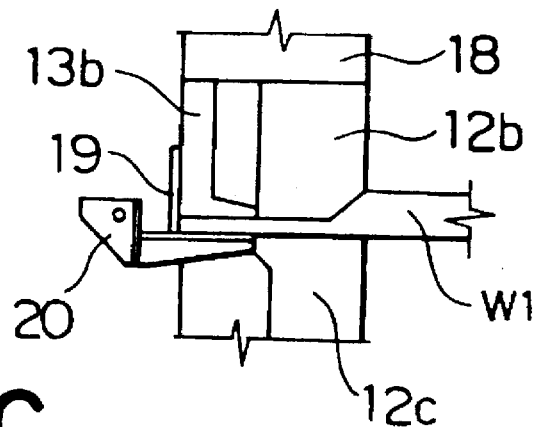
Figure 3C:
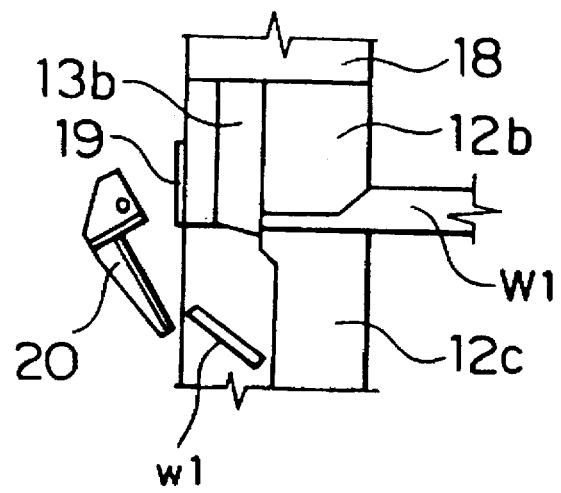

FIGS. 3(A), 3(B) and 3(C) show the procedure in which the shape scraps W1 are processed by the pressing means 12, the cutting means 13 and the shape scrap receiving member 20. In order to convey the shape scraps W1, to which previous pressing and cutting operation have done, by a predetermined length, the stationary conveyer 15 and the vertical conveyer 17 of the conveying means 11 are driven in timed relation to each other while the vertical conveyer 17 is lowered to a position of FIG. 1 so that the cut end of the shape scrap W1 strikes the stopper 19 as shown in FIG. 3(A). As a result, the driving of the conveying means 11 is terminated by a detection signal from a non-illustrated detector, such as a piezoelectric transducer.

Then the respective hydraulic cylinders 12a, 13a of the pressing means 12 and the cutting means 13 are simultaneously operated to lower the punch 12b and the cutting blade 13b. At that time, the compressed portion of the shape scrap W1 arrives at the cutting station of the cutting means 13 as supported on the upper surface of the shape scrap receiving member 20, and the punch 12b is located at an unpressed portion contiguous to the rear end of the cut portion as shown in FIG. 3(B). Then the punch 12b is lowered to crash the unpressed portion through a predetermined length. Simultaneously, the cutting blade 13b is lowered, touching the front surface of the punch 12b, to cut off the compressed portion of the cut scrap w1.

Figure 4:
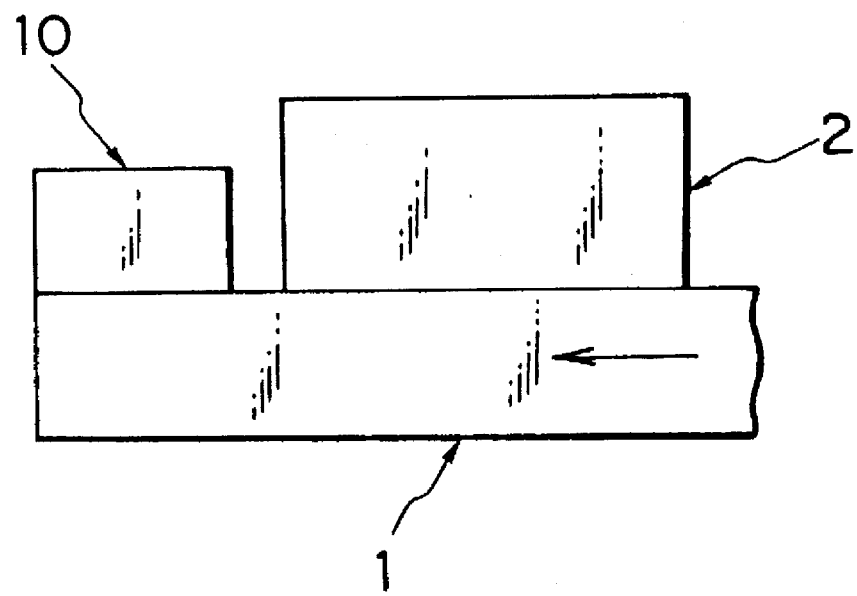
FIG. 4 is a plan view showing the shape scrap apparatus situated parallel in a conveying direction to a conveying table.

Then, as the shape scrap receiving member 20 is pivotally moved downwardly as shown in FIG. 3(C) to allow the cut scraps w1 to fall onto a discharge conveyer 21 by gravity, whereupon the cut scraps w1 are transferred to a basket 22 by the discharge conveyer 21. As this procedure is repeated, the continuous shape scraps W1 is processed and discharged out of the apparatus 10 as the cut scraps W1 having the reduced volume by being pressed. According to the illustrated example, a photoelectric tube 23 as detecting means is disposed at the upstream end (rear end) of the conveying means 11. When the trailing end of the shape scrap W1 is detected by the photoelectric tube 23, the conveying means 11 is driven to convey the shape scrap W1 by a predetermined length and is then stopped, whereupon the hydraulic cylinder 16 of the conveying means 11 is operated to shrink, thus raising the vertical conveyer 17 to an upper fixed position. The conveying table 1, the discharging unit 2, and the shape scrap processing apparatus 10 may be disposed in an arrangement that the shape scrap processing apparatus 10 is situated beside and downstream of the conveying table 1, as shown in FIG. 4.

As is apparent from the foregoing description, according to the shape scrap processing apparatus of this invention, partly since the pressing means 12 and the cutting means 13 are disposed side by side contiguously to each other, and partly since both the pressing means 12 and the cutting means 13 are simultaneously operated, the leading end portion of the shape scraps W1, which have been previously reduced in volume by the pressing means 12, is cut by the cutting means 13 into a regular length and, at the same time, the succeeding scrap portion contiguous to the cut portion is reduced in volume by pressing by a length substantially equal to the length for cutting in the next cycle. As this procedure is repeated, the shape scraps are W1 processed with a very improved rate of production. Further, since the cut scraps w1 are reduced in volume by pressing, it is possible to secure easy handling and this process can be automated with maximum ease.

What is claimed is:

1. A shape scrap processing apparatus comprising:

(a) conveying means for conveying shape scraps;

(b) stopping means disposed in a confronting relationship to and spaced a predetermined distance downstream of said conveying means;

(c) pressing means disposed contiguously to said conveying means downstream thereof, and operable while the conveying of the shape scraps is stopped, for pressing the shape scraps into a regular size;

(d) cutting means disposed side by side to said pressing means for cutting the shape scraps into a regular size in response to the operation of said pressing means;

(e) receiving means disposed between said stopping means and said pressing means for supporting said shape scraps from below and pivotally retractable downwardly in response to the operation of said cutting means; and (f) discharging means for discharging the cut scraps pressed by said pressing means and cut by said cutting means.

2. A shape scrap processing apparatus according to claim 1, wherein said shape scrap processing apparatus is disposed contiguously to a conveying table conveying a continuous shape cut in regular sizes and said shape scraps, wherein said shape scraps are discharged to said conveying means downstream of said conveying table in a scrap conveying direction.

3. A shape scrap processing apparatus according to claim 1, wherein said shape scrap processing apparatus is disposed beside a conveying table conveying a continuous shape cut in regular sizes and said shape scraps, wherein said shape scraps are discharged to said conveying means parallel to said conveying table in a scrap conveying direction.

4. A shape scrap processing apparatus according to claim 1, further including detecting means disposed at an upstream end of said conveying means.

* * * * *